April 1, 1930.  C. V. CHUPRIN  1,752,732
CUFF FASTENER
Filed Dec. 28, 1928
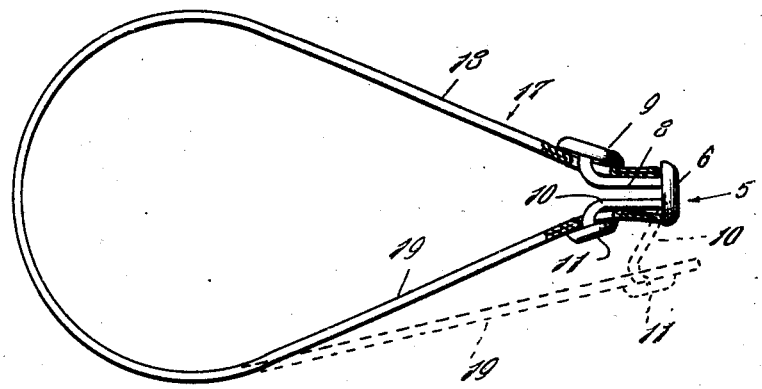
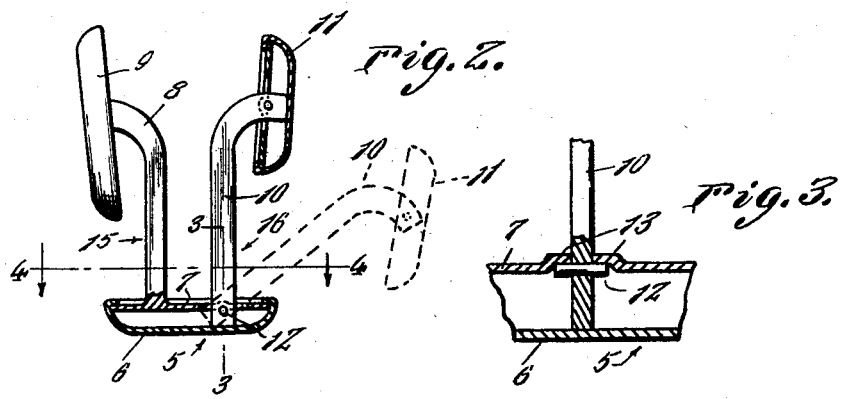
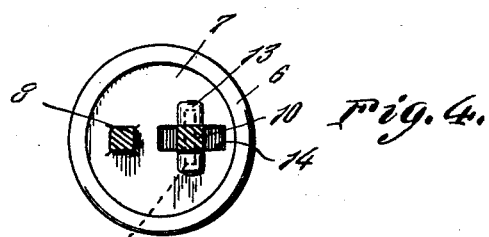
Inventor
C. V. Chuprin
By Clarence A. O'Brien
Attorney Patented Apr. 1, 1930

1,752,732

UNITED STATES PATENT OFFICE

CHARLES V. CHUPRIN, OF MOUNT CARMEL, PENNSYLVANIA

CUFF FASTENER

Application filed December 28, 1928. Serial No. 328,958.

This invention relates to an improved cuff button or fastener of the link type especially made for use in association with both stiff and soft cuffs on men's, boys' shirts, shirtwaists and the like.

There are various types of cuff links, fasteners and equivalent retainers patented and marketed, some of which embody completely separable fasteners, some with chains connecting heads together and others with a shank having a rigid head on one end and pivoted head on the other and so on. Most of these fasteners however, are such as to make it necessary to completely open the ends of the cuff to allow the shirt to be put on or removed.

The purpose of the present invention provides a special form of fastener which will remain in the cuff and which will allow the ends to separate sufficiently to permit the hand to be drawn therethrough, without disconnecting the fastener or parts thereof.

Briefly described, the improved fastener comprises an ornate body carrying a pair of complemental headed shanks, functioning as connecting links, one of which is stationary and the other one of which is relatively movable through the medium of a resilient pivotal connection.

The particular features and advantages of this improvement will become more readily apparent from the following description and drawings.

In the drawings:

Figure 1 is an elevational view of the improved fastener showing the same attached to the cuff and indicating the manner in which one end of the cuff is swung away from the cuff metal end to open these ends sufficiently, thus removing the fastener, to allow application and removal of the shirt, Figure 2 is an enlarged fragmentary detail sectional and elevational view of the fastener per se, Figure 3 is an enlarged fragmentary sectional view taken approximately upon the plane of the line 3—3 of Figure 2, Figure 4 is a horizontal section taken on the line 4—4 of Figure 2.

The body of the fastener is indicated by the reference character 5. It is in the form of a double spaced walled headed member including a hollow cap portion 6 carrying the diaphragm 7 which is formed integral with and extending at right angles to the diaphragm is the shank 8 of one link member. The outer end of this is curved outwardly and provided with an ornamental head 9.

The complemental link member comprises a similar shank 10 having a pivoted double spaced ornamental wall head on its outer end as at 11 having its inner end equipped with a pivot retaining pin 12 cooperating with a raised portion 13 on opposite sides of the slot 14.

The pin equipped end of the shank 10 extends into the shell like hollow cap 6 whereby to provide a resilient snap and pivotal connection allowing this complete link to swing to the dotted line position shown in Figures 1 and 2. The construction and pivotal mounting of the head 11 is indentical with that of the head 5. The first link is distinguished as a relatively stationary link 15 and the second one as a relatively movable link 16. The cuff is generally designated by reference character 17, one end portion 18 and the other end portion at 19.

These are provided with buttonholes through which the heads 9 and 11 pass thus disposing said portions 8 and 9 between the cuff ends and the body 5 against the spaced parallel edges of the cuff end. With this arrangement it is obvious that the side or end of the cuff can be swung out to the dotted line position indicated in Figure 1 showing which side the link 16 will swing outwardly, whereby to permit the ends of the cuff to separate sufficiently to permit the hand to be drawn through the cuff when putting the shirt on or taking the shirt off making it unnecessary to remove the fastener shank 10.

From the foregoing description and drawings it will be seen that I have evolved and produced an exceptionally simple and inexpensive cuff fastener which is ornamental, efficient and dependable, and a time saver.

Moreover this fastener is characterized by such faculties and qualification from a structural standpoint which enables it to better fulfill the requirements of an invention of this class. Hence it is regarded as a mechanical improvement in this already well developed art.

It is thought however that the structural features and advantages will become more readily apparent from the following description and drawings. Therefore, a more lengthy description is regarded unnecessary.

Minor changes in size, shape and rearrangement of details coming within the field of invention may be resorted to in actual practice if desired.

Having thus described my invention, what I claim as new is:

A cuff fastener comprising a pair of spaced parallel shanks having one end turned in opposite directions, heads having spaced walls rigidly mounted on the opposite ends of one of the shanks, heads having spaced walls pivotally mounted on the opposite ends of the other shank, said shank provided with pivot pins adjacent its ends for engagement with the inner walls of the heads and shanks further depending into said heads and abutting the outer walls thereof in a manner to provide a pivotal connection.

In testimony whereof I affix my signature.

CHARLES V. CHUPRIN.